United States Patent [19]
Stephenson et al.

[11] Patent Number: 6,076,349
[45] Date of Patent: Jun. 20, 2000

[54] HYDROSTATIC AUTOMOTIVE OR HIGH SPEED STEERING SYSTEM

[75] Inventors: Dwight B. Stephenson, Delafield, Wis.; Timothy A. Hjelsand, Waconia, Minn.

[73] Assignee: Eaton Corporation, Cleveland, Ohio

[21] Appl. No.: 09/302,463

[22] Filed: Apr. 29, 1999

[51] Int. Cl.[7] ........................... F15B 9/03
[52] U.S. Cl. ............... 60/384; 91/20; 91/363 R; 180/415
[58] Field of Search .................. 60/384; 91/20, 91/363 R; 180/415

[56] References Cited

U.S. PATENT DOCUMENTS

| | | | |
|---|---|---|---|
| 4,109,679 | 8/1978 | Johnson | 137/596.13 |
| 5,101,860 | 4/1992 | Stephenson | 137/625.24 |
| 5,960,694 | 10/1999 | Thomas et al. | 60/384 X |

*Primary Examiner*—Gerald A. Michaelsky
*Attorney, Agent, or Firm*—L. J. Kasper

[57] ABSTRACT

A full fluid-linked steering system, especially for use in on-highway steering, in which the system includes a fluid controller (21) including a fluid meter (65) operable to provide follow-up movement to controller valving (87,89), in response to the flow of fluid through the meter. The controller (21) includes a centering or biasing spring assembly (75) which provides sufficient torque that, upon rotation of the steering wheel (W), fluid is communicated to the steering actuator (19) without relative displacement of the valving, thus providing driver with the desired road feel. The system includes an EHC valve assembly (23) which controls flow to or from the actuator (19) in response to appropriate input signals (113,115) to maintain steered wheel to steering wheel registry.

6 Claims, 6 Drawing Sheets

HYDROSTATIC AUTOMOTIVE OR HIGH SPEED STEERING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE DISCLOSURE

The present invention relates to hydrostatic vehicle power steering systems, and more particularly, to such systems for use on vehicles which typically travel at relatively higher speeds, including but not limited to "on-highway" vehicles, such as automobiles and light trucks, as well as "high speed" tractors, i.e., those intended to travel at speeds in excess of about 30 mph. For simplicity, both types of vehicles will hereinafter be included within either of the terms "on-highway" and "high speed".

The typical vehicle power steering system has been one of two general types, depending upon the vehicle application. Traditional on-highway vehicles have utilized a mechanical steering gear (e.g., rack and pinion) with hydraulic power assist. In this type of system, there is a mechanical linkage between the steering wheel and the steered wheels, so that in the event of a loss of hydraulic power, the driver is still able to steer the vehicle. "Off-highway" vehicles have utilized a full fluid-linked steering system ("fluid-linked system") in which rotation of the steering wheel actuates a steering control unit ("SCU"), which is actually a valve controlling the flow of pressurized fluid from a pump, through the SCU, to a steering cylinder or other suitable device. The SCU conventionally includes a fluid meter which imparts follow-up movement to the valving, thus returning the valving to its neutral position after the desired amount of fluid has been directed by the SCU to the steering cylinder.

More recently, those skilled in the vehicle steering art have proposed hybrid mechanical-electrical systems, having no hydraulics, in which there is the conventional mechanical connection between the steering wheel and the steered wheels, but with the mechanical input receiving an electric motor assist. The proposed systems would include sensors to sense input parameters such as steering wheel position and torque, with these inputs being transmitted to the vehicle microprocessor to generate the appropriate electrical signal to energize the electric motor.

The mechanical steering gear type of system, whether hydraulically assisted or electric motor assisted, has several disadvantages. In the conventional mechanical steering gear systems, there is a rigid steering column extending from the steering wheel to the steering gear. In the event of a front-end collision, the steering column is, unfortunately, in the perfect location, and at nearly the perfect angle, to be forced through the firewall and toward the driver. Therefore, complicated and expensive solutions are necessary to make the steering column collapsible, to at least reduce the likelihood of injury to the driver caused by the steering column. In addition, the presence of the steering column in the engine compartment presents substantial challenges to the vehicle designer in regard to the layout and location of the engine and the various engine accessories. As is understood by those skilled in the vehicle art, the designer has very little choice with regard to the location of the steering wheel, or the location of the mechanical steering gear, and it is necessary to maintain a straight, clear "path", between the steering wheel and the steering gear, for the steering column.

Another disadvantage of the conventional mechanical steering gear type of system has more recently become apparent. As the market for many cars and light trucks has become more "global" in nature, there has arisen a need for the vehicle manufacturers to offer both "left-hand drive" and "right-hand drive" versions of each particular model. The need to effectively "reverse" the steering system, in order to convert a normally left-hand drive vehicle to right-hand drive, or vice versa, may necessitate that some of the steering system components (e.g., the rack and pinion assembly) be duplicated, in the sense of having two different part numbers to inventory, wherein the parts are substantially identical, but reversed. The change between left-hand and right-hand drives is also likely to result in some major rearrangements within the engine compartment, in order to accommodate the steering column on the opposite side of the engine from its normal, left-hand location. This can be an especially difficult rearrangement in the case of transverse engine vehicles.

Greater system flexibility, in terms of system layout, can be achieved utilizing the full fluid-linked type of system which has traditionally been used on off-highway vehicles. In other words, each component of a fluid-linked system could be used for either left- or right-hand drive, and the only connection between the SCU and the actuator is hoses, which greatly simplifies the task of laying out the engine compartment. However, several characteristics commonly found in such systems have seemingly made the fluid-linked systems ill-suited for on-highway vehicles. First, the fluid-linked systems have typically had insufficient "load reaction" or road feel, and thus are normally not acceptable to the driver. Second, there has generally been excessive "neutral dead band", such that the steering control at relatively higher vehicle speeds is unacceptable. Third, the "registry", or position correlation, between the steering wheel and the steered wheels has typically not been maintained sufficiently, especially at the end of travel, to satisfy the on-highway driver.

BRIEF SUMMARY OF THE INVENTION

Accordingly, it is an object of the present invention to provide a steering system adapted for an on-highway type of vehicle, or for a high speed off-highway vehicle, which overcomes the above-described problems of the prior art mechanical steering gear type of system, such as the need for a somewhat rigid steering column interconnecting the steering wheel and the steering gear.

It is another object of the present invention to provide a full fluid-linked hydrostatic power steering system which provides the desired system flexibility, while overcoming the above-described disadvantages of the prior art fluid-linked system, such as insufficient road feel and excessive travel-limit slip.

The above and other objects of the invention are accomplished by the provision of an improved full fluid-linked steering system adapted to provide input movement to a pair of steered wheels of an on-highway type vehicle, in response to manual input to a steering member. The steering system comprises a source of pressurized fluid, a fluid controller, and a fluid pressure operated actuator adapted to be operably associated with the pair of steered wheels to provide the input movement thereto in response to manual input to the steering member. The fluid controller includes housing means defining an inlet port in fluid communication with the source of pressurized fluid and a control port in fluid communication with the actuator. The fluid controller further includes a fluid meter having a moveable member operable to measure fluid flow through the fluid meter, and valve means including a primary, rotatable valve member and a cooperating, relatively rotatable follow-up valve member. The fluid controller further includes means biasing the primary and follow-up valve members toward a neutral position, relative to each other, and means operable to transmit movement of the moveable member of the fluid meter into follow-up movement of the follow-up valve member.

The improved steering system is characterized by the biasing means being selected such that manual input to the steering member up to a torque level of X results in a corresponding bias of the moveable member of the fluid meter without relative displacement of the primary and follow-up valve members, the torque level of X corresponding to a desired road feel. The steering system further comprises valve means having an inlet in fluid communication with the source of pressurized fluid and an outlet in fluid communication with the actuator, and including valving moveable in response to an external input signal to permit fluid communication from the inlet to the outlet. The steering system also includes means operable to sense the manual input to the steering member and generate, in response thereto, the external input signal, whereby pressurized fluid is communicated to the actuator even before relative displacement of the primary and follow-up valve members occurs.

DETAILED DESCRIPTION OF THE PREFERRED EMBODIMENT

Figure 1:
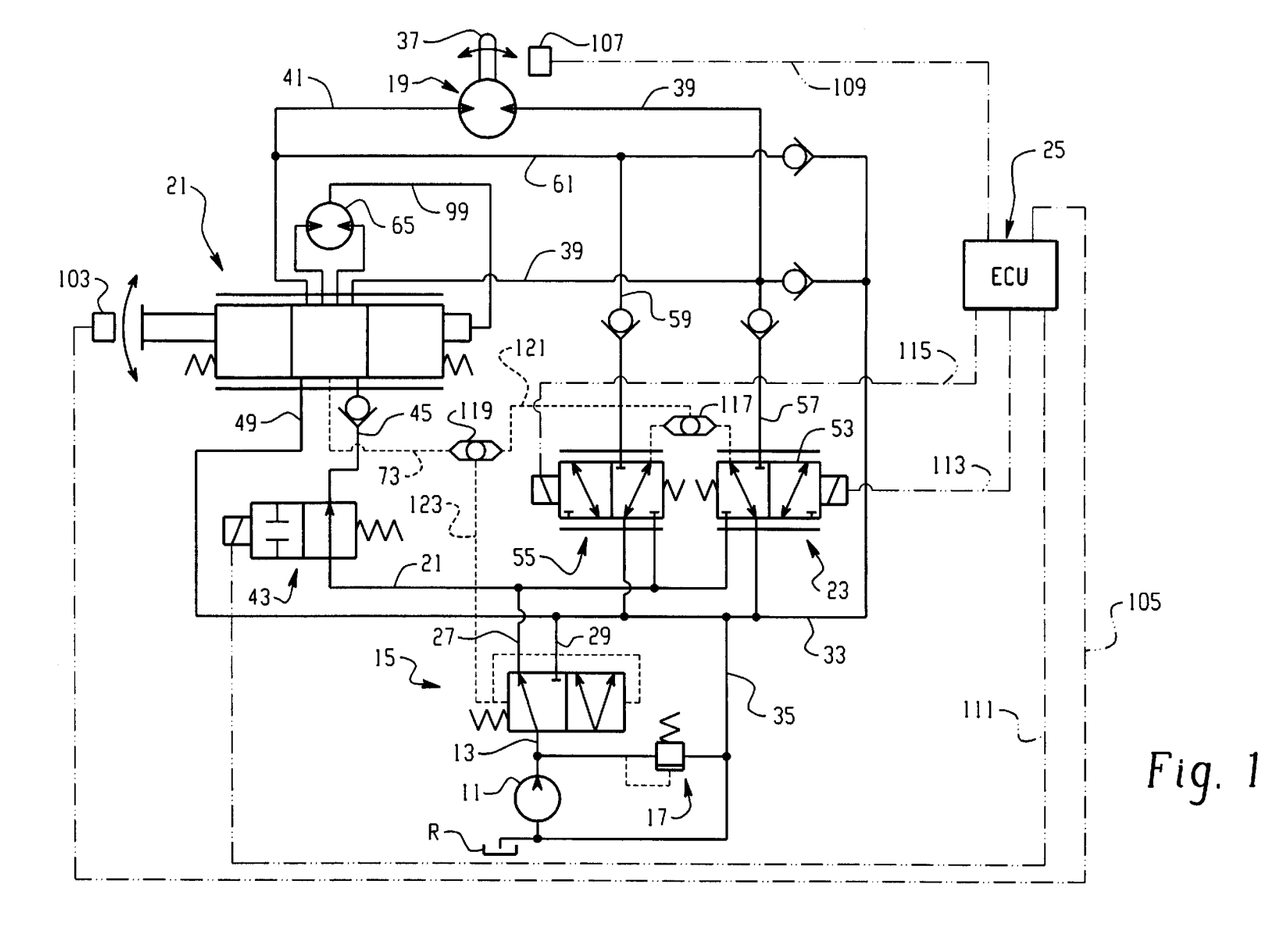
FIG. 1 is a hydraulic schematic of a hydrostatic power steering system made in accordance with the present invention.

Referring now to the drawings, which are not intended to limit the invention, FIG. 1 is a hydraulic schematic of a hydrostatic power steering system made in accordance with the present invention. The system includes a fluid pump 11 which has its inlet connected to a system reservoir R. The outlet of the pump 11 is in communication by means of a conduit 13 with the inlet of a load sensing priority flow control valve, generally designated 15, of the type illustrated and described in U.S. Pat. No. 3,455,210, assigned to the assignee of the present invention and incorporated herein by reference. The pressure output of the fluid pump 11 is limited by a pressure relief valve 17, such that any pressure in excess of a predetermined maximum is simply communicated back to the system reservoir R.

The remainder of the hydrostatic power steering system may be viewed as comprising a plurality of subsystems including an actuator 19; a fluid controller, also referred to as a steering control unit (SCU), generally designated 21 (the details of which are shown only in FIG. 2, but not in FIG. 1, for ease of illustration); an electrohydraulic control (EHC) valve assembly, generally designated 23; and a vehicle microprocessor (ECU), generally designated 25.

As is well known to those skilled in the load sensing control art, the priority valve 15 has a "CF" (controlled or priority flow) outlet, having connected thereto a conduit 27, and an "EF" (excess flow) outlet, having connected thereto a conduit 29. The conduit 27 is illustrated in FIG. 1 as being teed into a conduit 31 which comprises the input to both the SCU 21 and the EHC valve assembly 23. The conduit 29 is shown in FIG. 1 as being teed into a conduit 33 which, in turn, is teed into a conduit 35 which drains back to the system reservoir R.

In the subject embodiment, and by way of example only, the actuator 19 is shown schematically as a motor (i.e., a rotary actuator) having an output shaft 37 or other suitable rotary output member which would typically be mechanically coupled, such as by means of a drag link, or a Pitman arm, to provide the actual mechanical input to the pair of steered wheels (not shown herein). It should be understood by those skilled in the art that the particular type of actuator 19 utilized, and the manner in which it is used to provide a steering input to the steered wheels, is not an essential feature of the invention. Connected to the opposite sides of the actuator 19 are conduits 39 and 41, with pressurized fluid in the conduit 39 effecting a right turn of the vehicle, and pressurized fluid in the conduit 41 effecting a left turn.

In fluid communication with the conduit 31, and being generally associated with the SCU 21, is a two-position, two-way solenoid valve, generally designated 43, the outlet of the solenoid valve 43 being communicated by means of a conduit 45 to an inlet port 47 (see FIG. 2) of the SCU 21. There is a conduit 49 in communication with the conduit 33, and then through the conduit 35 to the system reservoir R. Also connected to the conduit 49 is a return port 51 (see FIG. 2) of the SCU 21.

As noted above, the conduit 31 also serves as the input to the EHC valve assembly 23 which, in the subject embodiment, and by way of example only, comprises a pair of identical proportional solenoid (EHC) valves 53 and 55. The valves 53 and 55 could also be replaced by a single three-way, three-position valve. The EHC valve 53 has its outlet port connected by a conduit 57 to the conduit 39, while the outlet port of the EHC valve 55 is connected by a conduit 59 and a conduit 61, to the conduit 41. Subsequent references to the "outlet" or the "outlet port" of the valves 53 and 55 will bear the reference numerals of the conduits 57 and 59, respectively. Although not an essential feature of the present invention, the steering system may be made in accordance with the teachings of co-pending application U.S. Ser. No. 09/028,218, filed Feb. 23, 1998, now U.S. Pat. No. 5,960,694, in the names of David W. Thomas; David E.

Ewel; Timothy A. Hjelsand; Jerry F. Carlin; and Russell P. Schuchmann, for a "HYDROSTATIC POWER STEERING SYSTEM HAVING REDUCED WHEEL SLIP", which is assigned to the assignee of the present invention, and incorporated herein by reference.

Figure 2:
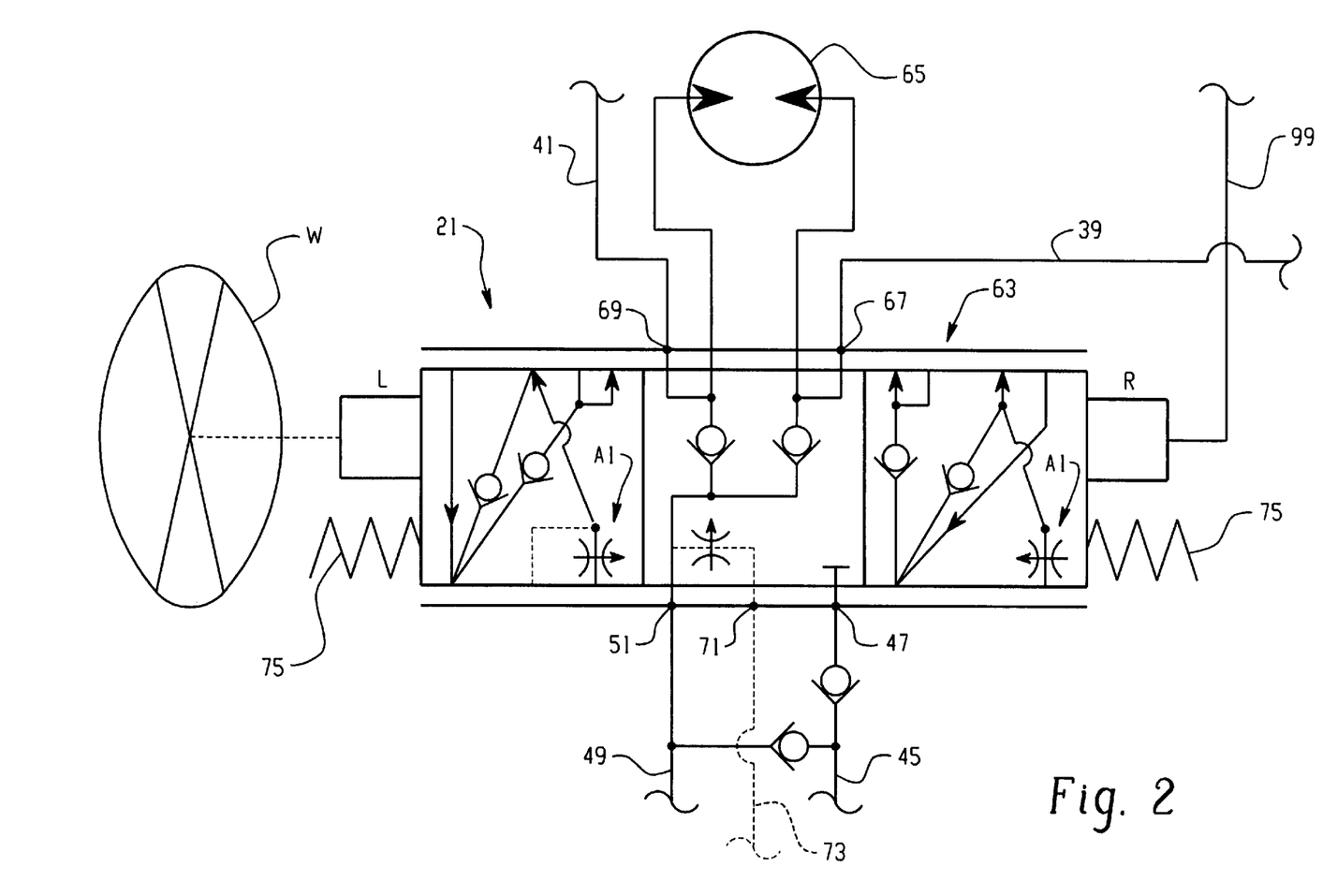
FIG. 2 is an enlarged, fragmentary hydraulic schematic, showing only the steering control unit of the system shown in FIG. 1.

Referring now primarily to FIG. 2, the SCU 21 is operated by a steering input device, such as a steering wheel W, to control the flow of fluid from the inlet port 47 to the actuator 19, in a manner which is generally well known to those skilled in the SCU art. It should be understood that the present invention is not limited to any particular type or configuration of SCU, except as may be specifically noted hereinafter. The SCU 21 includes valving, generally designated 63, and a fluid meter 65. As is also well known to those skilled in the steering art, one function of the fluid meter 65 is to "measure" the fluid flowing through the SCU 21, and impart following-up movement to the valving 63, returning the valving 63 to its neutral position (center position in FIGS. 1 and 2) after the desired amount of fluid has been communicated to the actuator 19. Preferably, the SCU is of the type wherein, when the valving 63 is in its neutral position, the SCU 21 has "load reaction" capability, whereby the conduits 39 and 41 are in relatively unrestricted fluid communication, through the valving 63, with the opposite sides of the fluid meter 65, as shown schematically in FIG. 2. As a result, and as is well known in the art, external loads applied to the steered wheels, and therefore applied to the output shaft 37, will impose a hydraulic load in one of the conduits 39 or 41 (depending upon the direction of the applied force) which in turn will apply a load hydraulically to the fluid meter 65. This load will be felt by the driver at the steering wheel W, thus constituting one aspect of "road feel" which, as was noted in the BACKGROUND OF THE DISCLOSURE is desirable in on-highway and high speed power steering systems of the type to which the invention relates.

It may be seen in FIG. 2 that a number of the flow paths include check valves, and more specifically, anti-cavitation check valves. Thus, the SCU 21 may, preferably, be made in accordance with the teachings of U.S. Pat. No. 5,101,860, for a "FLUID CONTROLLER AND IMPROVED CHECK VALVE ARRANGEMENT THEREFOR", assigned to the assignee of the present invention and incorporated herein by reference.

Referring still to FIG. 2, the SCU 21 includes a pair of control fluid ports 67 and 69, connected to the conduits 39 and 41, respectively. The SCU 21 also includes a load signal port 71, by means of which a load signal 73 is communicated, as will be described in greater detail subsequently. Finally, it should be noted in FIG. 2 that the SCU valving 63 is biased toward the neutral position shown in FIG. 2 by means of a biasing spring assembly 75, shown schematically as two separate biasing means, but as is well known to those skilled in the art, the assembly 75 comprises a single spring assembly which is operable to return the valving 63 from either a right turn condition R or a left turn condition L, back to the neutral (centered) position. The biasing spring assembly 75, which is shown in detail in FIG. 3A, will be discussed in greater detail subsequently.

Figure 3:
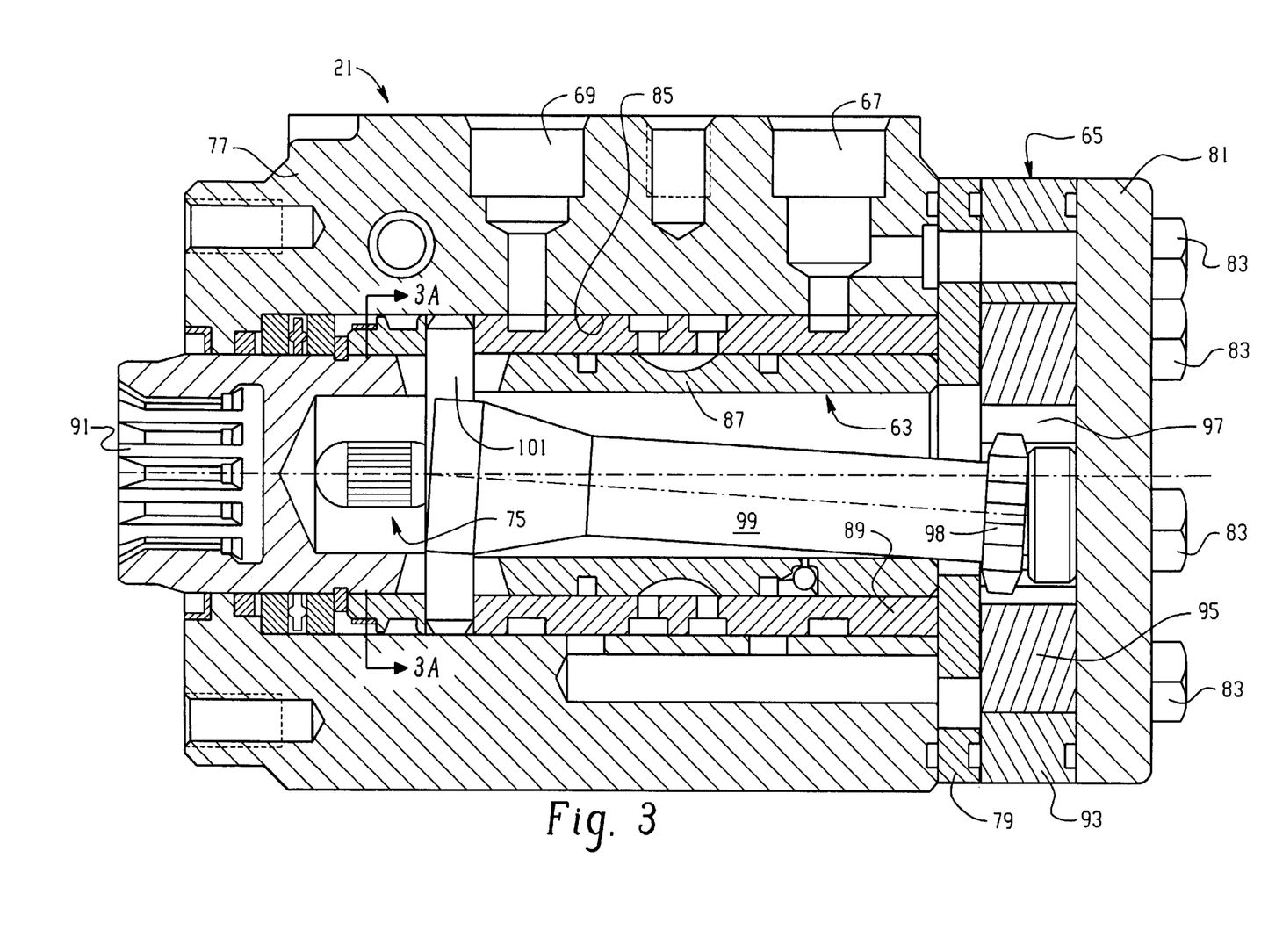
FIG. 3 is an axial cross-section of the steering control unit shown schematically in FIG. 2.
Figure 3A:
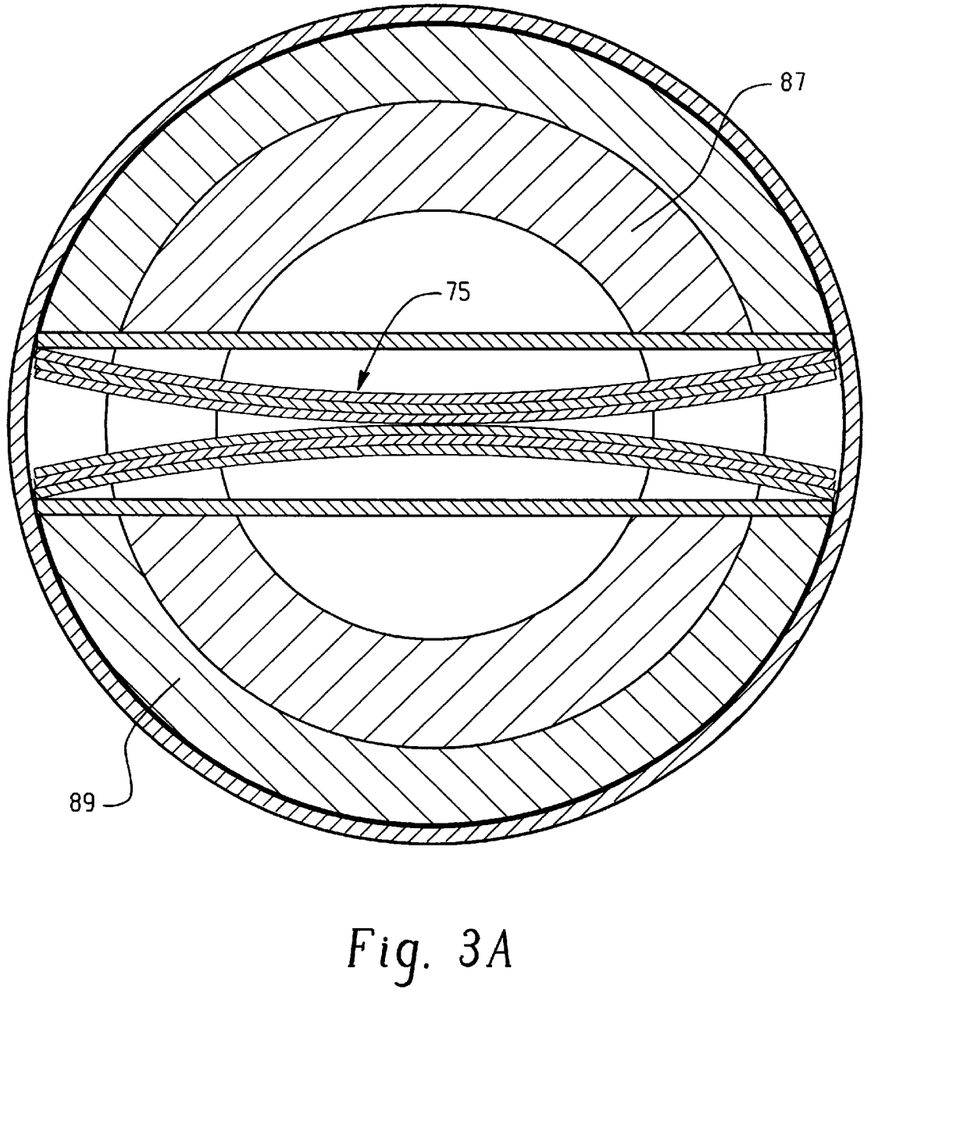
FIG. 3A is an enlarged transverse cross-section, taken on line 3A—3A of FIG. 3, but showing only the spool, sleeve, and spring assembly, and excluding the housing.

Referring now primarily to FIG. 3, the SCU 21 will be described, but only briefly in view of above-incorporated U.S. Pat. No. 5,101,860. The SCU 21 may also be made in accordance with the teachings of U.S. Pat. No. 4,109,679, which is also assigned to the assignee of the present invention and incorporated herein by reference. The SCU 21 comprises several sections, including a housing section 77, a port plate 79, a section comprising the fluid meter 65, and an end plate 81. These sections are held together in tight sealing engagement by means of a plurality of bolts 83 (only the heads of which show in FIG. 3). The housing section 77 typically defines all of the fluid ports recited previously, only the control fluid ports 67 and 69 being visible in the plane of FIG. 3.

The housing section 77 further defines a valve bore 85, and disposed rotatably therein is the valving 63, shown schematically in FIGS. 1 and 2, and comprising a primary, rotatable valve member 87 ("spool"), and a cooperating, relatively rotatable follow-up valve member 89 ("sleeve"). As is well known in the art, the forward end (left end in FIG. 3) of the spool 87 includes a reduced diameter portion defining a set of internal splines 91 which provide for a direct mechanical connection between the steering wheel W and the spool 87.

The fluid meter 65 may be of the type well known in the art, and includes an internally-toothed stationary ring 93, and an externally-toothed moveable star 95. The star 95 defines a set of internal splines 97, and in splined engagement therewith is a set of external splines 98 formed at the rearward end of a drive shaft 99 (also shown schematically in FIGS. 1 and 2). The drive shaft 99 has a forward end engaging a pin 101. As is well known in the SCU art, the orbital and rotational movement of the star 95 is translated, by the drive shaft 99 and pin 101, into rotational follow-up movement of the sleeve 89. One function of the follow-up arrangement is to maintain a particular relative displacement between the spool 87 and sleeve 89, proportional to the rate of rotation of the steering wheel W, which is also a function of the torque applied to the steering wheel W. Disposed forwardly of the shaft 99 and pin 101 is the biasing spring assembly 75 described previously. The biasing spring assembly 75 shown herein may be of generally conventional configuration and construction, the details of which are not essential features of the present invention. Instead, and as will be described in greater detail subsequently, what is important about the assembly 75 is that it provide a substantially greater biasing or centering force than in typical, prior art fluid controllers.

Referring again to FIG. 1, further aspects of the system will be described. Operably associated with the steering wheel W (or with some portion of the steering column, etc.), is a steering wheel position sensor 103 which transmits to the ECU 25 a signal 105 representative of instantaneous steering wheel position. Similarly, a steered wheel position sensor 107 is operably associated with the steered wheels or with the output shaft 37, or with some other portion of the steering linkage, and transmits to the ECU 25 a signal 109 representative of instantaneous steered wheel position. Among the outputs of the ECU 25 are an on/off command signal 111, operable to control the position of the solenoid valve 43, and a pair of proportional command signals 113 and 115, operable to control the EHC valves 53 and 55, respectively.

The steering system also includes a pair of shuttle valves 117 and 119. The shuttle valve 117 transmits the higher of the two load signals from the EHC valves 53 and 55 as a load signal 121, which is one of the inputs to the shuttle valve 119, the other input being the load signal 73 from the SCU 21. The output of the shuttle valve 119 is a load signal 123, which is the higher of the load signals 73 and 121. The load signal 123 is transmitted back to the load signal chamber of the load sensing priority valve 15 in a manner well known to those skilled in the art. Thus, the fluid pressure output of the valve 15, at the conduit 27 corresponds to the highest load signal sensed within the entire steering system.

Figure 4:
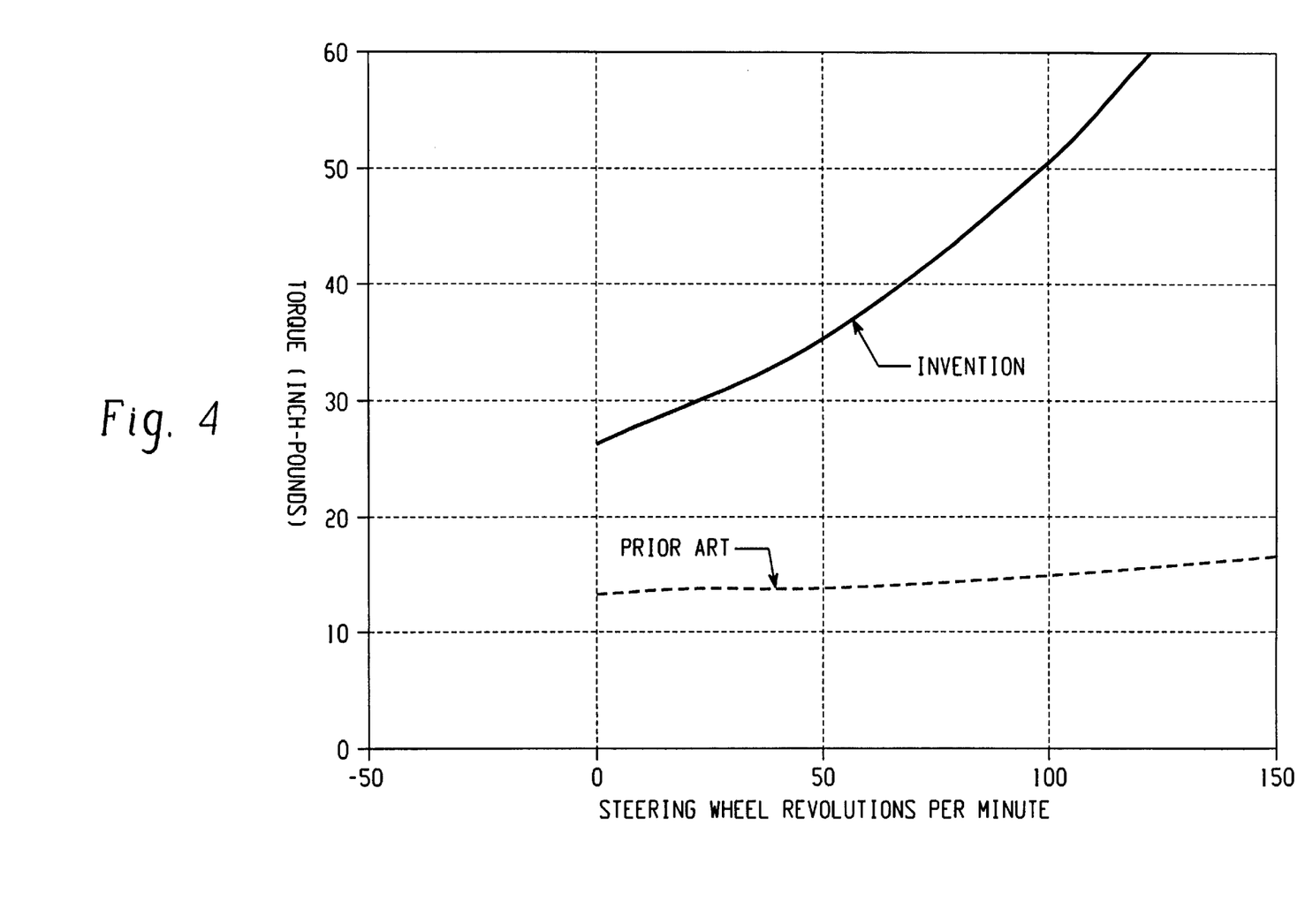
FIG. 4 is a graph of torque, in inch pounds, required to turn the steering wheel as a function of the speed, in rpm, of rotation of the steering wheel, comparing one aspect of the present invention to the prior art.

Referring now to FIG. 4, in conjunction with FIGS. 1 through 3, certain significant aspects of the present invention will be described. In a typical, prior art, full fluid-linked steering system of the general type illustrated schematically in FIG. 1, for use in an off-highway vehicle, the biasing spring assembly 75 would normally be designed to operate in accordance with the graph labeled "PRIOR ART" in FIG. 4. In that case, as is well known to those skilled in the SCU art, applying a relatively small torque (for example, 15 inch pounds) to the steering wheel W would begin to relatively displace the spool and sleeve, i.e., would move the valving 63 from the neutral position shown in FIGS. 1 and 2 toward either the right turn condition R or the left turn condition L, depending up the direction of rotation of the steering wheel W. After several degrees of relative displacement of the spool and sleeve, the various flow control orifices (such as the A1 orifice shown schematically in FIG. 2) would begin to open and communicate pressurized fluid from the inlet port 47 through the fluid meter 65 and out to one of the control fluid ports 67 or 69, in the conventional manner. As was noted in the BACKGROUND OF THE DISCLOSURE, the typical, prior art full fluid-linked steering system, even one of the load reaction type, does not provide the type of road feel considered necessary for acceptable on-highway type steering systems.

In accordance with one aspect of the present invention, the biasing spring assembly 75 is selected in accordance with the graph labeled "Invention" in FIG. 4, to correspond generally to the desired road feel of the system. Thus, and by way of example only, even at relatively low speeds of rotation of the steering wheel, the spring assembly 75 will provide a centering torque in the range of about 20 inch pounds to about 40 inch pounds, and preferably about 25 to about 30 inch pounds. It should be noted that references herein, and in the appended claims, to a particular road feel or centering torque refer to the torque present at essentially zero RPM input to the steering wheel, rather than to the torque present when the wheel is being rotated at some substantial speed. The impact of selecting the centering springs to correspond to the desired road feel will be better understood from the subsequent description of operation of the system. It is clearly within the ability of those skilled in the art of fluid controllers and spring assemblies to provide the spring assembly 75 having the desired biasing torque relationship.

Referring again primarily to FIG. 1, when the vehicle operator begins to rotate the steering wheel W, the position sensors 103 and 107 will transmit signals 105 and 109, respectively, to the ECU 25 indicating the presence of an "error" between the steered wheel and steering wheel positions. Initially, the ECU will transmit no command signal 111 to the valve 43 such that the valve 43 is spring biased to the position shown in FIG. 1, a position providing unrestricted flow from the conduit 31 to the conduit 45. At the same time, and assuming that the steering wheel W has been rotated clockwise for a right turn, the ECU 25 will transmit an appropriate signal 113 to the EHC valve 53, but no signal 115 to the EHC valve 55. Thus, pressurized fluid will be communicated from the conduit 31 through the EHC valve 53 to the conduit 57, and into the conduit 39, so that the actuator 19 begins to rotate and move the output shaft 37 to achieve steering even before there is relative displacement of the spool 87 and sleeve 89. The result is that there is substantially zero neutral dead band, i.e., as soon as the steering wheel W begins to move, there is corresponding fluid flow to the actuator 19.

As was explained above, one important aspect of the invention is the provision of a spring assembly 75 which has a centering torque approximately equal to the desired road feel. Thus, as soon as the vehicle operator begins to turn the steering wheel W, fluid is "pumped" from the fluid meter 65 (acting as a hand pump), through the conduit 39, so that the actuator 19 begins to rotate and move the output shaft 37 to achieve steering even before there is relative displacement of the spool 87 and sleeve 89. Whether fluid is first communicated from the fluid meter 65 to the actuator 19, or is first communicated from the EHC valve assembly 23 to the actuator 19, is not essential to the present invention. It is believed that in a commercially acceptable system, fluid flow from the fluid meter 65 and from the EHC valve assembly 23 will occur at nearly the same time, and will occur quickly enough to provide a substantially zero neutral dead band.

As noted above, the pressurized fluid in the conduit 39 will be communicated to the actuator 19, beginning to rotate the output shaft 37 in an attempt to "null" the error signal. At the same time, the pressure in the conduit 39 is communicated back to the output side of the fluid meter 65, because the SCU 21 is of the load reaction type, and the valving 63 is, at this point in time, still in the neutral position. The pressure communicated from the conduit 39 to the fluid meter 65 applies a "backward" biasing force, resisting the normal orbital and rotational movement of the star 95. Therefore, the torque of the biasing spring assembly 75 and the effect of the pressure in the conduit 39 together comprise the road feel, sensed by the vehicle operator in rotating the steering wheel W.

During the ongoing operation of the steering system of the present invention, whenever there is a discrepancy between the steering wheel position signal 105 and the steered wheel position signal 109, the result will be an appropriate command signal being sent from the ECU 25 to the EHC valve assembly 23 to correct the error. For example, and assuming that the steering wheel W is still being rotated clockwise for a right turn, when the ECU 25 senses an error, indicating that the position of the steered wheels is lagging behind the desired position, a command signal 113 will be sent to the EHC valve 53, resulting in fluid flowing from the conduit 31, through the EHC valve 53, to the conduit 57, then to the conduit 39, as an assist to the fluid being communicated from the SCU 21 to the actuator 19. Thus, when the error signal at the ECU 25 has been nulled out, the system will be sure that there is "registry" between steering wheel and steered wheel positions, both during normal steering, and at travel limit, i.e., when the steered wheels reach the stops.

Figure 5:
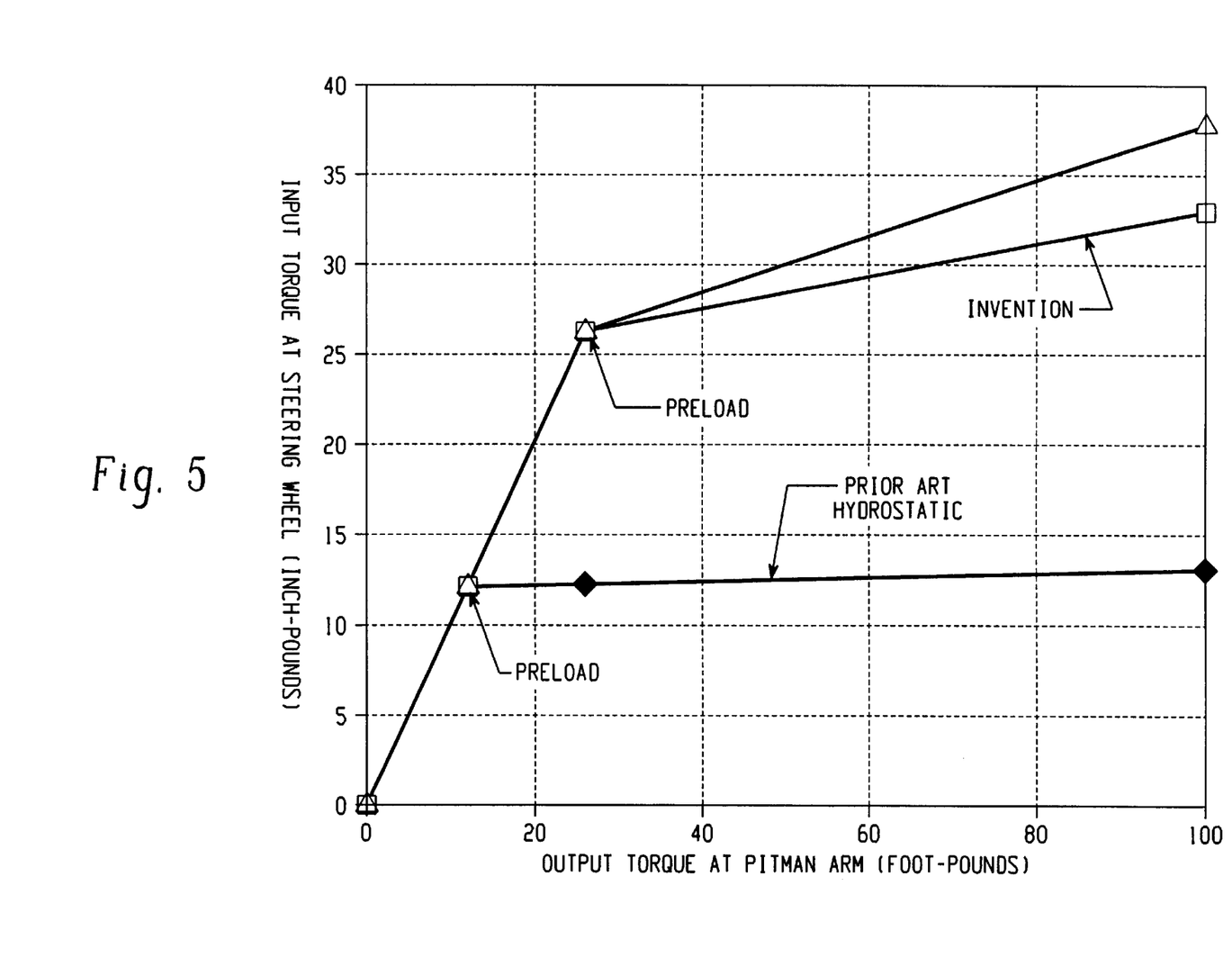
FIG. 5 is a graph of input torque, in inch pounds, required to turn the steering wheel, as a function of output torque, in foot pounds, at the output of the steering actuator, comparing the present invention to the prior art hydrostatic power steering system.

Referring now primarily to FIG. 5, the difference between the present invention and a typical hydrostatic power steering system will become more apparent. Either system starts at the zero position and progresses up the nearly vertical line, until the input torque to the steering wheel reaches about 12 inch pounds (the preload of the centering springs), the angle of the nearly vertical line being a function of the size of the fluid meter 65. Thus, the invention is being compared to the prior art, assuming the same meter size in either case. With the prior art system, the slope of the line extending to the right from the 12 inch pound point is determined by the spring rate of the SCU centering springs. What is important to note here is that if, for example, a reaction force of about 60 foot pounds is exerted by the road, the driver will never feel more about 13 inch pounds of road feel with the prior art system.

Referring still to FIG. 5, with the present invention, the upper part of the nearly vertical line represents that portion of the operation, unique to the present invention, in which the SCU 21 is acting only as a hand pump, until the input torque to the steering wheel reaches about 26 inch pounds (the preload of the centering spring assembly 75). At that point, the line extending upward and to the right ("INVENTION") also has its slope determined by the spring rate of the centering springs 75. In accordance with an important aspect of the invention, if the same reaction force of about 60 foot pounds is again exerted by the road, the drive would now feel about 30 inch pounds of road feel, a much better situation for the drive than in the case of the prior art.

In accordance with the teachings of the co-pending application U.S. Ser. No. 09/028,218, now U.S. Pat. No. 5,960,694 as the steered wheels approach any predetermined position, such as the end-of-travel stops, even though the error signal will typically approach zero, the ECU 25 will generate an appropriate signal 113 or 115 to whichever of the EHC valves 53 and 55 is on the "high pressure" side of the system. At the same time, an appropriate command signal 111 will be transmitted to the valve 43, overcoming the bias force of the spring, and biasing the valve 43 to the position blocking flow from the conduit 31 to the conduit 45, which allows the pressure in the conduit 31 to be greater than the pressure in the conduit 45. Thus, with pressurized fluid being introduced into the high pressure conduit 39 or 41, just as the steered wheels reach the predetermined position, the backward bias on the fluid meter 65, as described previously, will prevent any further rotation of the steering wheel W. Therefore, in the case of the predetermined position being the travel stop, as the steered wheels reach the stop, the vehicle operator will not be able to rotate the steering wheel W any further, and the result will be the same as if there were no travel limit slip. The end of travel condition just described may be considered a special case of the general need for maintaining steered wheel to steering wheel registry.

In designing a steering system of the hydrostatic type, one of the factors to be considered is the relationship between the fluid displacement of the fluid meter 65 and that of the actuator 19. With the system of the present invention, several alternatives are possible. The fluid meter 65 could have the same displacement as the actuator 19 (divided by the lock-to-lock ratio of the system). Alternatively, the fluid meter 65 could be somewhat smaller, in which case it would be necessary to add fluid through the EHC valve assembly 23. Finally, the fluid meter 65 could be somewhat larger than the actuator 19 (divided by the lock-to-lock ratio), in which case it would be necessary to subtract fluid through the EHC valve assembly 23. It should be understood by those skilled in the art that the invention is not limited to any particular arrangement of the EHC valve assembly 23, and the appended claims are intended to include either a "meter-in" arrangement, in which fluid is added through the assembly 23, or a "meter-out" arrangement, in which fluid is removed through the assembly 23. It is believed to be well within the ability of those skilled in the art to modify the circuit shown in FIG. 1 to accomplish either arrangement, or others of similar import.

The present invention could also be utilized to provide a form of "flow amplification", as that term is now understood in the hydrostatic power steering art. In that case, the EHC valve assembly 23 would be controlled to provide not only the necessary "make-up" fluid, to null out any error signal, but in addition, would direct a certain amount of extra fluid, so that the total flow to the actuator 19 would always be some multiple of the amount of fluid flowing from the fluid meter 65. The multiple (flow amplification ratio) could be constant, or could be varied and tailored to match factors such as vehicle speed, turning angle, etc.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A full fluid-linked steering system adapted to provide input movement to a pair of steered wheels of an on-highway type vehicle, in response to manual input to a steering member, said steering system comprising a source of pressurized fluid, a fluid controller, and a fluid pressure operated actuator adapted to be operably associated with said pair of steered wheels to provide said input movement thereto in response to manual input to said steering member; said fluid controller including housing means defining an inlet port in fluid communication with said source of pressurized fluid, and a control port in fluid communication with said actuator, said fluid controller further including a fluid meter having a movable member operable to measure fluid flow through said fluid meter, and valve means including a primary, rotatable valve member, and a cooperating, relatively rotatable follow-up valve member, and means biasing said primary and follow-up valve members toward a neutral position, relative to each other, and means operable to transmit movement of said movable member of said fluid meter into follow-up movement of said follow-up valve member; characterized by:

(a) said biasing means being selected such that manual input to said steering member up to a torque level of X results in a corresponding bias of said movable member of said fluid meter without relative displacement of said primary and follow-up valve members, said torque level of X corresponding to a desired road feel of the steering system;

(b) said steering system further comprising valve means being in fluid communication with a source of fluid, and in fluid communication with said actuator, and including valving moveable in response to an external input signal to permit fluid communication between said source and said actuator;

(c) means operable to sense said manual input to said steering member and generate, in response thereto, said external input signal;

(d) whereby pressurized fluid is communicated to said actuator even before relative displacement of said primary and follow-up valve members occurs.

2. A full fluid-linked steering system as claimed in claim 1, characterized by pressurized fluid being first communicated from said fluid meter to said actuator, before said relative displacement of said primary and follow-up valve members occurs.

3. A full fluid-linked steering system as claimed in claim 1, characterized by pressurized fluid being first communicated from said valve means to said actuator (19), before said relative displacement of said primary) and follow-up valve members occurs.

4. A full fluid-linked steering, system as claimed in claim 1, characterized by said torque level of X is in the range of about 20 to about 40 inch pounds.

5. A full fluid-linked steering system as claimed in claim 1, characterized by said torque level of X is in the range of about 25 to about 30 inch pounds.

6. A full fluid-linked steering system as claimed in claim 1, characterized by said valve means having an inlet in fluid communication with said source of pressurized fluid, and an outlet in fluid communication with said actuator, said valving permitting fluid communication from said inlet to said outlet, in response to said external input signal.

\* \* \* \* \*